United States Patent
Ando

(10) Patent No.: US 11,762,606 B2
(45) Date of Patent: Sep. 19, 2023

(54) IMAGE PROCESSING SYSTEM INCLUDING REPRINT FEATURE WITH IMPROVED MEASURES AGAINST UNINTENDED DISSEMINATION OF CONFIDENTIAL INFORMATION

(71) Applicant: Takumi Ando, Tokyo (JP)

(72) Inventor: Takumi Ando, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/348,968

(22) Filed: Jun. 16, 2021

(65) Prior Publication Data

US 2022/0011983 A1    Jan. 13, 2022

(30) Foreign Application Priority Data

Jul. 8, 2020  (JP) ................. 2020-118084

(51) Int. Cl.
*G06F 3/12* (2006.01)
*G06T 7/00* (2017.01)
*G06K 15/00* (2006.01)

(52) U.S. Cl.
CPC ............ *G06F 3/121* (2013.01); *G06F 3/1234* (2013.01); *G06K 15/403* (2013.01); *G06T 7/001* (2013.01); *G06T 2207/30144* (2013.01)

(58) Field of Classification Search
CPC ...... G06F 3/1234; G06F 3/121; G06F 3/1259; G06F 3/1282; G06F 3/1208; G06K 15/403; G06K 15/408; G06T 7/001
See application file for complete search history.

(56) References Cited

U.S. PATENT DOCUMENTS

| | | | | |
|---|---|---|---|---|
| 6,088,119 A | * | 7/2000 | Manchala | ............. G06F 21/608 358/1.14 |
| 2012/0162649 A1 | | 6/2012 | Ishizaki et al. | |
| 2013/0016374 A1 | | 1/2013 | Kawamoto et al. | |
| 2013/0044342 A1 | | 2/2013 | Kaneko et al. | |

(Continued)

FOREIGN PATENT DOCUMENTS

| | | |
|---|---|---|
| JP | 2006-243999 | 9/2006 |
| JP | 2015-120264 | 7/2015 |

OTHER PUBLICATIONS

English Machine Translation of JP 2002-292983-A (Ichikawa, Published Oct. 9, 2002) (Year: 2002).*

*Primary Examiner* — Juan M Guillermety
(74) *Attorney, Agent, or Firm* — IPUSA, PLLC

(57) ABSTRACT

An image processing apparatus includes a memory and circuitry. The memory is configured to store a result of inspection. The inspection includes: comparison of a sample image data and a first read image data that is data of an image formed on a recording medium and read; and determination whether the image indicated by the first read image data is abnormal. The memory is configured to store the result of inspection in association with the image determined as an abnormal image. The circuitry is configured to receive second read image data from a discarding apparatus. The circuitry is configured to specify image data according to which an image is formed, based on the abnormal image stored in the memory and the second read image data received. The circuitry is configured to instruct formation of the image according to the image data specified.

9 Claims, 7 Drawing Sheets

(56) References Cited

U.S. PATENT DOCUMENTS

| | | |
|---|---|---|
| 2013/0250319 A1* | 9/2013 | Kaneko .................. G06T 7/001 358/1.9 |
| 2013/0250369 A1 | 9/2013 | Kitai et al. |
| 2013/0250370 A1 | 9/2013 | Kojima et al. |
| 2013/0250377 A1 | 9/2013 | Kitai et al. |
| 2013/0250378 A1 | 9/2013 | Kitai et al. |
| 2014/0036290 A1 | 2/2014 | Hiromitsu et al. |
| 2014/0079292 A1 | 3/2014 | Kaneko et al. |
| 2014/0079293 A1 | 3/2014 | Kitai et al. |
| 2014/0268259 A1 | 9/2014 | Kitai |
| 2014/0268260 A1 | 9/2014 | Kitai et al. |
| 2014/0285853 A1* | 9/2014 | Hiramatsu ......... G06K 15/1872 358/3.24 |
| 2014/0313538 A1 | 10/2014 | Kitai et al. |
| 2014/0341437 A1* | 11/2014 | Araki .................... G06T 7/001 382/112 |
| 2015/0063654 A1 | 3/2015 | Kitai |
| 2015/0269719 A1 | 9/2015 | Kitai |
| 2017/0031636 A1 | 2/2017 | Kitai |

* cited by examiner

FIG. 7

| PAGE NO. | SCAN DATA |
|---|---|
| 5 | SCANNED IMAGE OF PAGE 5 |
| 11 | SCANNED IMAGE OF PAGE 11 |
| 13 | SCANNED IMAGE OF PAGE 13 |
| 20 | SCANNED IMAGE OF PAGE 20 |
| ... | ... |

FIG. 8

| PAGE NO. | SCAN DATA | MASTER DATA | DEFECT |
|---|---|---|---|
| 1 | SCANNED IMAGE OF PAGE 1 | MASTER IMAGE OF PAGE 1 | NO |
| 2 | SCANNED IMAGE OF PAGE 2 | MASTER IMAGE OF PAGE 2 | NO |
| 3 | SCANNED IMAGE OF PAGE 3 | MASTER IMAGE OF PAGE 3 | YES |
| 4 | SCANNED IMAGE OF PAGE 4 | MASTER IMAGE OF PAGE 4 | NO |
| ... | ... | ... | ... |

IMAGE PROCESSING SYSTEM INCLUDING REPRINT FEATURE WITH IMPROVED MEASURES AGAINST UNINTENDED DISSEMINATION OF CONFIDENTIAL INFORMATION

CROSS-REFERENCE TO RELATED APPLICATION

This patent application is based on and claims priority pursuant to 35 U.S.C. § 119(a) to Japanese Patent Application No. 2020-118084, filed on Jul. 8, 2020, in the Japan Patent Office, the entire disclosure of which is hereby incorporated by reference herein.

BACKGROUND

Technical Field

Embodiments of the present disclosure relate to an image processing apparatus, an image processing method, and an image processing system.

Related Art

There are known printers having a function of reprinting after detecting defects. Specifically, a printed matter produced by the printer is read by a scanning function. The read image is compared with a master image, which is an image used for printing, to determine whether the printed matter is defective. The printer reprints in a case in which a defect is detected.

An operator discards, as wastepaper, the printed matter produced by the printer and determined as a defective printed matter. For example, in a case in which the printed matter includes confidential information such as personal information, the defective printed matter must be discarded without being taken out.

SUMMARY

In one embodiment of the present disclosure, a novel image processing apparatus includes a memory and circuitry. The memory is configured to store a result of inspection. The inspection includes: comparison of a sample image data and a first read image data that is data of an image formed on a recording medium and read; and determination whether the image indicated by the first read image data is abnormal. The memory is configured to store the result of inspection in association with the image determined as an abnormal image. The circuitry is configured to receive second read image data from a discarding apparatus. The circuitry is configured to specify image data according to which an image is formed, based on the abnormal image stored in the memory and the second read image data received. The circuitry is configured to instruct formation of the image according to the image data specified.

Also described are novel image processing method and image processing system.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a diagram illustrating a first example of recorded data according to an embodiment of the present disclosure; and FIG. 8 is a diagram illustrating a second example of recorded data according to an embodiment of the present disclosure.

Figure 1:
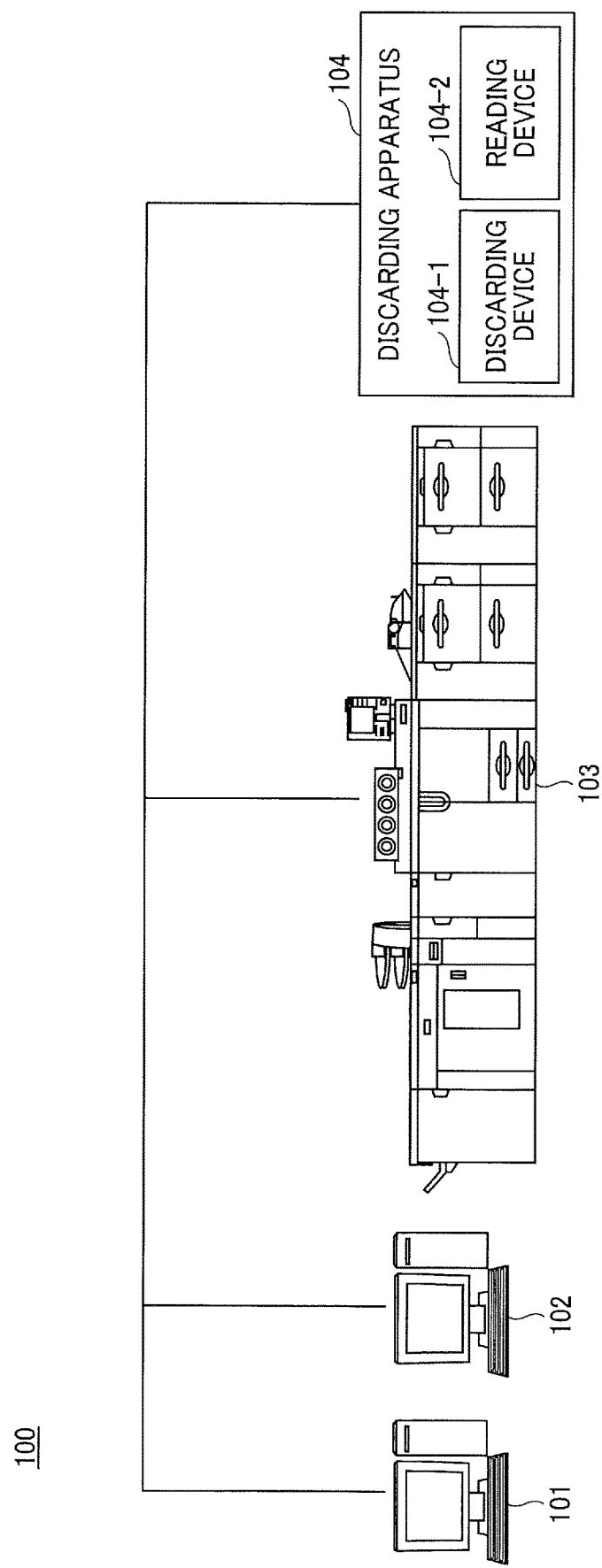
FIG. 1 is a diagram illustrating a configuration of a system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

Referring to the drawings, wherein like reference numerals designate identical or corresponding parts throughout the several views, embodiments of the present disclosure are described below.

Initially with reference to FIG. 1, a description is given of a configuration of a system according to an embodiment of the present disclosure.

FIG. 1 is a diagram illustrating a configuration of a system 100 according to an embodiment of the present disclosure.

As illustrated in FIG. 1, the system 100 serving as an image processing system may include a client personal computer (PC) 101, a digital front end (DFE) 102, an image forming apparatus 103, and a discarding apparatus 104. The client PC 101, the DFE 102, the image forming apparatus 103, and the discarding apparatus 104 are connected to a wired or wireless network to transmit and receive data. Now, a description is given of each of the client PC 101, the DFE 102, the image forming apparatus 103, and the discarding apparatus 104.

The client PC 101 generates a print job according to a request from a user. The client PC 101 transmits the generated print job to the DFE 102. The client PC 101 may include a display such as a liquid crystal display and an input device such as a mouse or a keyboard.

The DFE 102 receives a print job from the client PC 101 (or a server, for example). The DFE 102 generates drawing data with a raster image processor (RIP) engine according to the received print job. The DFE 102 transmits the generated drawing data to the image forming apparatus 103.

The image forming apparatus 103 forms an image according to the drawing data received from the DFE 102.

The discarding apparatus 104 includes a discarding device 104-1 and a reading device 104-2. The discarding device 104-1 discards a recording medium. When discarding a printed matter determined as a defective printed matter (that is, wastepaper), the discarding apparatus 104 reads the printed matter with the reading device 104-2. The discarding apparatus 104 transmits read image data to the network. The discarding apparatus 104 is, e.g., a shredder equipped with the reading device 104-2 such as an in-line sensor and a network function to transmit image data of discarded paper through the network.

Note that the image forming apparatus 103 is an example of an image processing apparatus. The DFE 102 is another example of the image processing apparatus.

Figure 2:
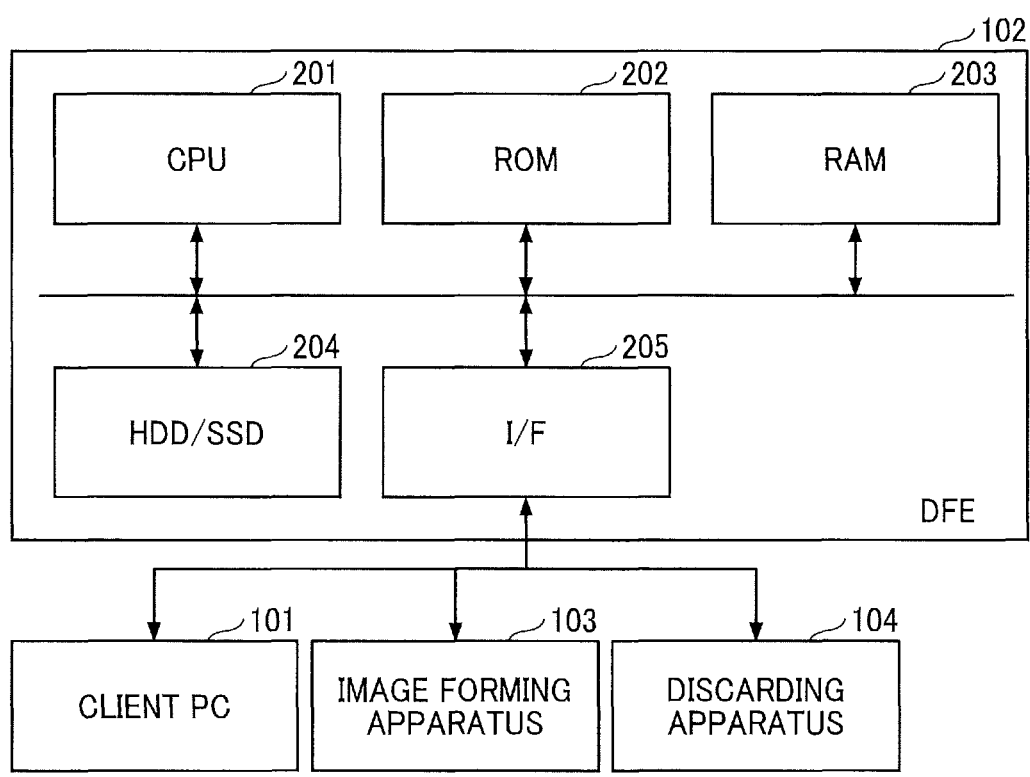
FIG. 2 is a block diagram illustrating a hardware configuration of a digital front end (DFE) according to an embodiment of the present disclosure.
Figure 3:
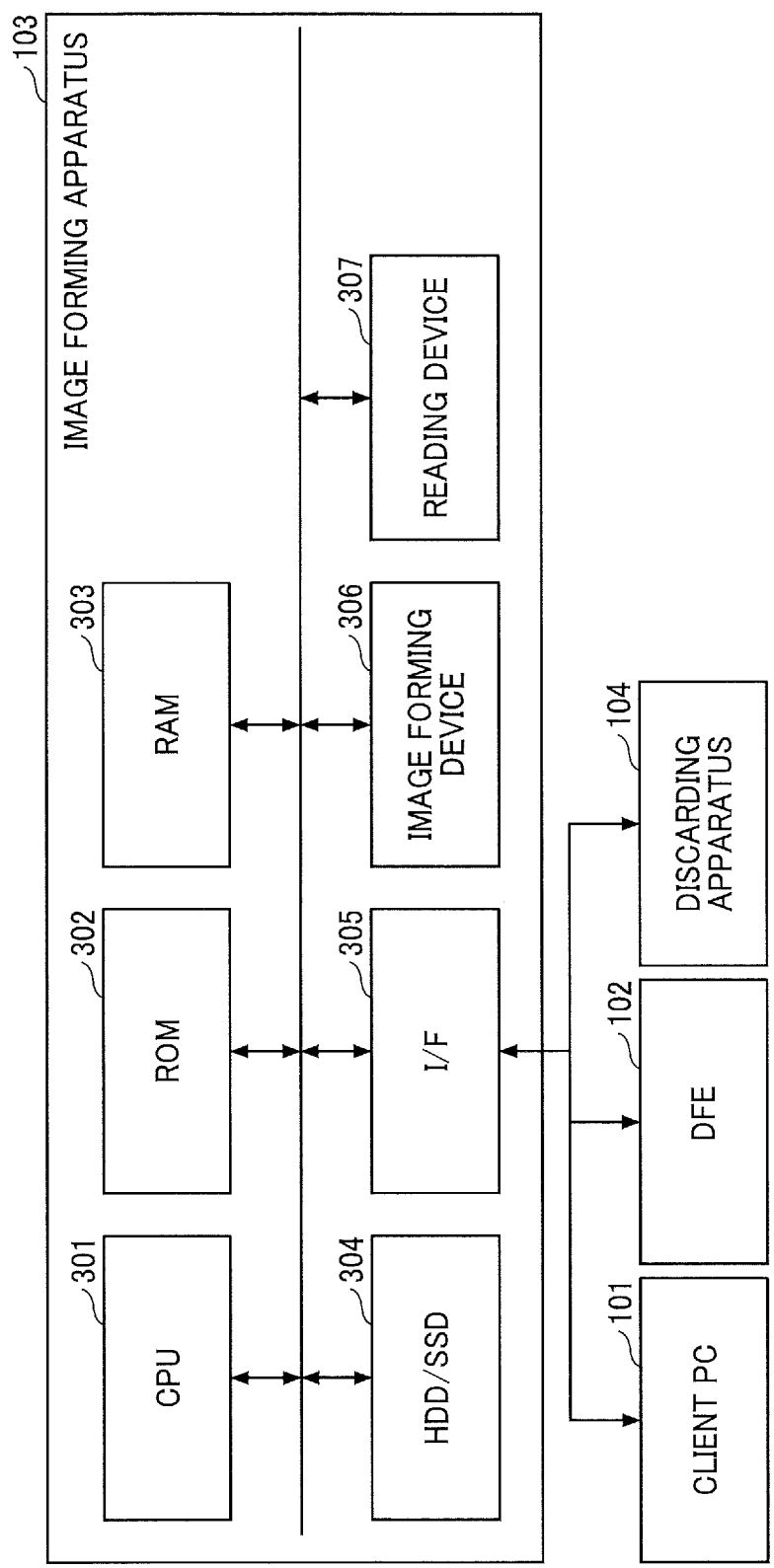
FIG. 3 is a block diagram illustrating a hardware configuration of an image forming apparatus according to an embodiment of the present disclosure.

Referring now to FIGS. 2 and 3, a description is given of a hardware configuration of the DFE 102 and a hardware configuration of the image forming apparatus 103, respectively.

Initially with reference to FIG. 2, a description is given of the hardware configuration of the DFE 102.

FIG. 2 is a block diagram illustrating the hardware configuration of the DFE 102 according to an embodiment of the present disclosure.

As illustrated in FIG. 2, the DFE 102 includes a central processing unit (CPU) 201, a read only memory (ROM) 202, a random access memory (RAM) 203, a hard disk drive/solid state drive (HDD/SSD) 204, and an interface (I/F) 205.

The CPU 201 uses the RAM 203 as a work area to execute a program stored in the ROM 202.

The ROM 202 stores image data transmitted from the image forming apparatus 103 (that is, image data read by a reading device 307 of the image forming apparatus 103) (in a case in which the DFE 102 includes a reprint specifying unit 405).

The RAM 203 stores image data transmitted from the image forming apparatus 103 (that is, image data read by the reading device 307 of the image forming apparatus 103) (in a case in which the DFE 102 includes the reprint specifying unit 405).

The HDD/SSD 204 is used as a storage device or a memory to store preset values. The CPU 201 may use the information stored in the HDD/SSD 204 when executing a read program. The HDD/SSD 204 stores image data transmitted from the image forming apparatus 103 (that is, image data read by the reading device 307 of the image forming apparatus 103) (in a case in which the DFE 102 includes the reprint specifying unit 405).

The I/F 205 is an interface that allows the DFE 102 to communicate with the client PC 101, the image forming apparatus 103, and the discarding apparatus 104.

Referring now to FIG. 3, a description is given of the hardware configuration of the image forming apparatus 103.

FIG. 3 is a block diagram illustrating the hardware configuration of the image forming apparatus 103 according to an embodiment of the present disclosure.

As illustrated in FIG. 3, the image forming apparatus 103 includes a CPU 301, a ROM 302, a RAM 303, an HDD/SSD 304, and an I/F 305, an image forming device 306, and the reading device 307.

The CPU 301 uses the RAM 303 as a work area to execute a program stored in the ROM 302.

The ROM 302 stores image data transmitted from the reading device 307 (that is, image data read by the reading device 307) (in a case in which the image forming apparatus 103 includes the reprint specifying unit 405).

The RAM 303 stores image data transmitted from the reading device 307 (that is, image data read by the reading device 307) (in a case in which the image forming apparatus 103 includes the reprint specifying unit 405).

The HDD/SSD 304 is used as a storage device or a memory to store preset values. The CPU 301 may use the information stored in the HDD/SSD 304 when executing a read program. The HDD/SSD 304 stores image data transmitted from the reading device 307 (that is, image data read by the reading device 307) (in a case in which the image forming apparatus 103 includes the reprint specifying unit 405).

The I/F 305 is an interface that allows the image forming apparatus 103 to communicate with the client PC 101, the DFE 102, and the discarding apparatus 104.

In response to an instruction from the CPU 301, the image forming device 306 forms or prints an image on a recording medium such as a sheet of paper.

The reading device 307 reads (or scans) an image formed by the image forming device 306. The reading device 307 transmits, as read image data, data of the read image to the RAM 303.

Figure 4:
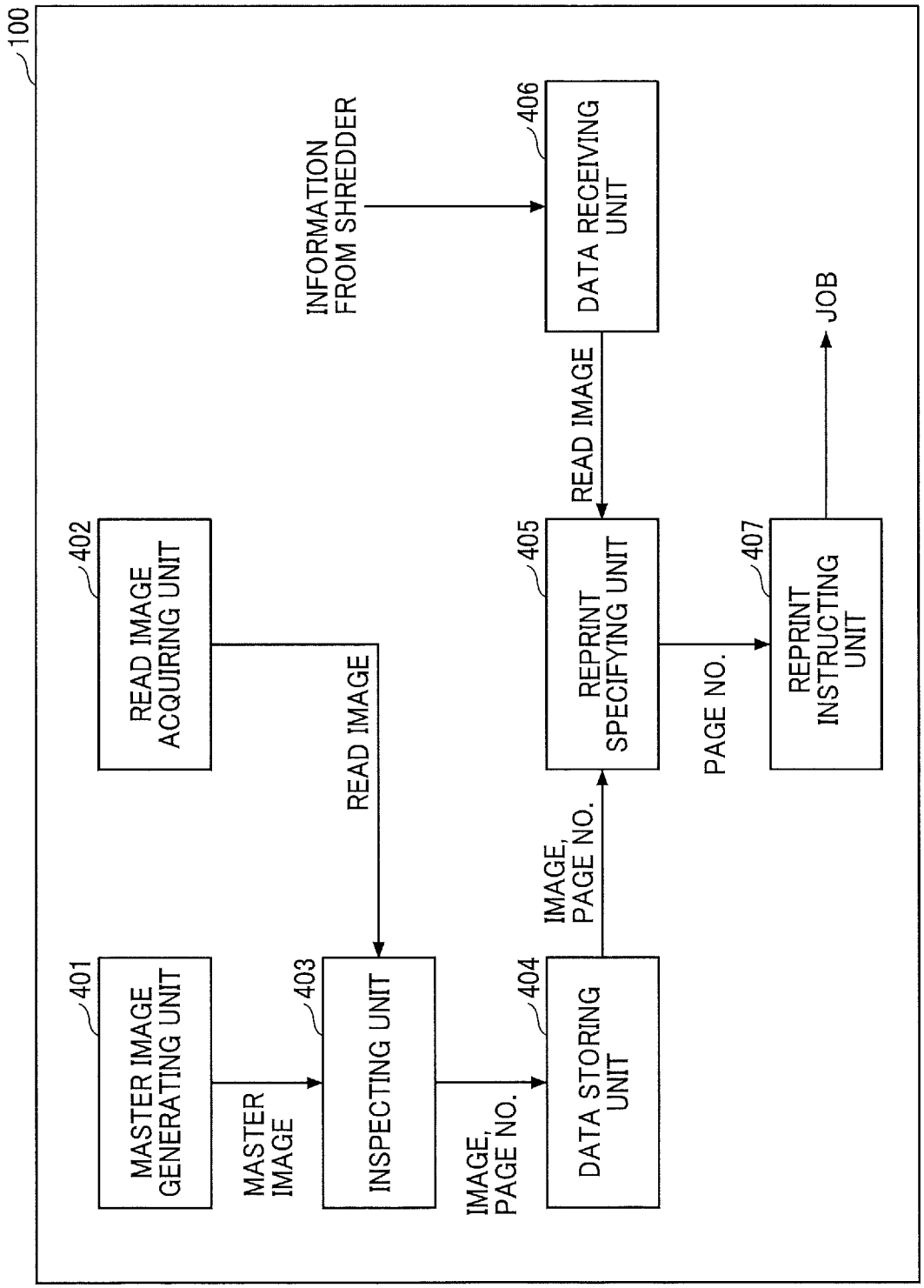
FIG. 4 is a block diagram illustrating a functional configuration of a system according to an embodiment of the present disclosure.

Referring now to FIG. 4, a description is given of a functional configuration of the system 100.

FIG. 4 is a block diagram illustrating the functional configuration of the system 100 according to an embodiment of the present disclosure.

The system 100 includes a master image generating unit 401, a read image acquiring unit 402, an inspecting unit 403, a data storing unit 404, the reprint specifying unit 405, a data receiving unit 406, and a reprint instructing unit 407.

The image forming apparatus 103 includes the master image generating unit 401. An inspection apparatus or the like used together with the image forming apparatus 103 includes the read image acquiring unit 402 and the inspecting unit 403.

For example, the image forming apparatus 103 may include the data storing unit 404, the reprint specifying unit 405, the data receiving unit 406, and the reprint instructing unit 407. Alternatively, the DFE 102 may include the data storing unit 404, the reprint specifying unit 405, the data receiving unit 406, and the reprint instructing unit 407.

The master image generating unit 401 generates, as sample image data, data of a master image, which is an image that the image forming device 306 forms or prints on a recording medium such as a sheet of paper. The master image generating unit 401 transmits the generated master image data to the image forming device 306 and the inspecting unit 403.

The read image acquiring unit 402 acquires, as first read image data, image data of a read printed matter bearing images, from the reading device 307 of the image forming apparatus 103. That is, the first read image data is data of an image formed on a recording medium and read. The read image acquiring unit 402 transmits the read image data of the printed matter to the inspecting unit 403.

In an inspection, the inspecting unit 403 acquires data (i.e., sample image data) from the master image generating unit 401 and data (i.e., first read image data) from the read image acquiring unit 402. The inspecting unit 403 compares the sample image data and the first read image data and determines whether an image indicated by the first read image data is abnormal (or defective, for example).

The inspecting unit 403 stores, in the data storing unit 404, the result of inspection and image data of a page determined as a defective page. In other words, the data storing unit 404 stores the result of inspection in association with the image determined as an abnormal or defective image. A detailed description of the data stored in the data storing unit 404 is deferred, with reference to FIGS. 7 and 8.

The reprint specifying unit 405 compares image data from the data receiving unit 406 (that is, image data read by the reading device 104-2 such as an in-line sensor of the discarding apparatus 104) with image data stored in the data storing unit 404 (that is, image data read by the reading device 307) to specify image data according to which an image is formed. In a case in which the data storing unit 404 stores image data determined to be identical to the image data from the data receiving unit 406, the reprint specifying unit 405 acquires, from the data storing unit 404, information such as a page number (serving as an example of information indicating the image data) of the page and transmits the information to the reprint instructing unit 407.

From the discarding apparatus 104, the data receiving unit 406 receives, as second read image data, image data read by the reading device 104-2 such as an in-line sensor of the discarding apparatus 104. The data receiving unit 406 transmits the received image data to the reprint specifying unit 405.

The reprint instructing unit 407 generates a reprint job based on the information from the reprint specifying unit 405. In other words, the reprint instructing unit 407 instructs formation of the image according to the image data specified by the reprint specifying unit 405. Reprinting is executed according to the reprint job.

Figure 5:
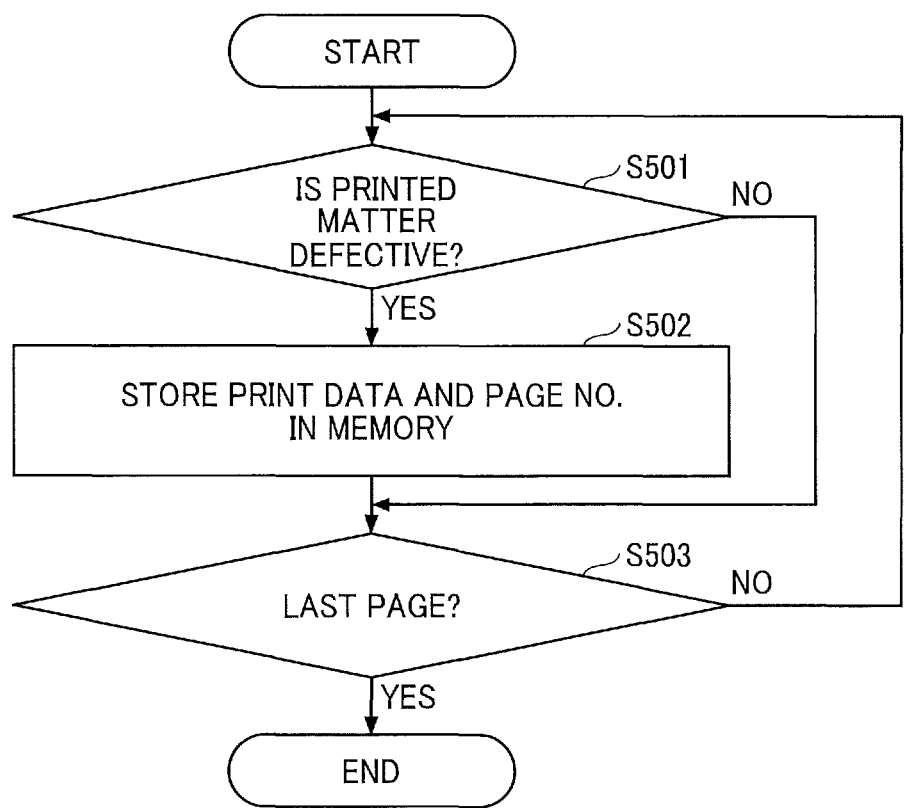
FIG. 5 is a flowchart of a process at the time of printing according to an embodiment of the present disclosure.
Figure 6:
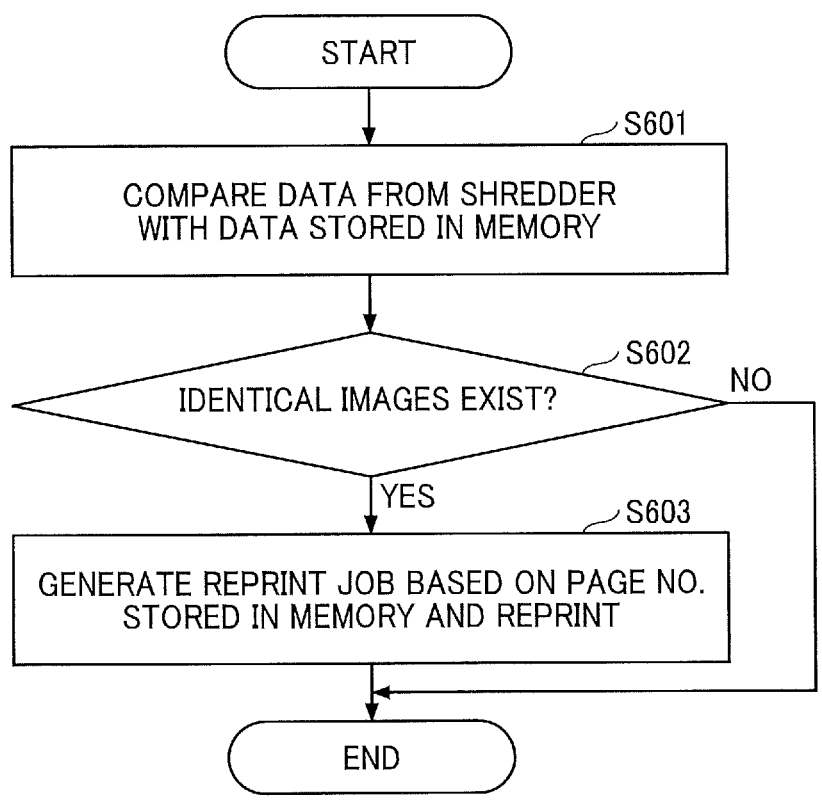
FIG. 6 is a flowchart of a reprint process according to an embodiment of the present disclosure.

Referring now to FIGS. 5 and 6, a description is given of a processing method.

FIG. 5 is a flowchart of a process at the time of printing according to an embodiment of the present disclosure.

As the printing starts, the following process starts.

In step S501, the inspecting unit 403 determines whether a printed matter is defective. When the printed matter is defective (YES in step S501), the process proceeds to step S502. By contrast, when the printed matter is not defective (NO in step S501), the process proceeds to step S503. Note that, in a case in which the information of all pages is stored regardless of the result of inspection, the data is stored in the data storing unit 404 as in step S502 even when the inspecting unit 403 determines that the printed matter is not defective in step S501 and the process proceeds to step S503.

In step S502, the inspecting unit 403 stores, in the data storing unit 404 as a memory, the image data (as print data) read by the reading device 307 and the page number of the page subjected to the determination in step S501.

In step S503, the CPU 301 of the image forming apparatus 103, for example, determines whether the present page is the last page. When the present page is not the last page (NO in step S503), the process returns to step S501. By contrast, when the present page is the last page (YES in step S503), the process ends.

FIG. 6 is a flowchart of a reprint process according to an embodiment of the present disclosure.

As the data receiving unit 406 receives data from the discarding apparatus 104 such as a shredder, the following process starts.

In step S601, the reprint specifying unit 405 compares the data received by the data receiving unit 406 from the discarding apparatus 104 (e.g., shredder) with data stored in the data storing unit 404 (i.e., memory).

In step S602, the reprint specifying unit 405 determines whether identical images exist as a result of comparison in step S601. Specifically, in step S602, the reprint specifying unit 405 determines whether any one of the images stored in the data storing unit 404 is identical to the image received from the discarding apparatus 104. When the reprint specifying unit 405 determines that identical images exist (YES in step S602), the process proceeds to step S603. By contrast, when the reprint specifying unit 405 determines that identical images do not exist (NO in step S602), the process ends.

In step S603, the reprint instructing unit 407 generates a reprint job based on the information stored in the data storing unit 404 (i.e., memory), such as the page number of the page having the image determined as the image identical to the image received from the discarding apparatus 104 in step S602. Thereafter, reprinting is executed.

Referring now to FIGS. 7 and 8, a description is given of some examples of data that are recorded.

FIG. 7 is a diagram illustrating a first example of recorded data according to an embodiment of the present disclosure.

Specifically, FIG. 7 illustrates a first example of a table stored in the data storing unit 404. In the example of FIG. 7, the information of pages determined as defective pages by the inspecting unit 403 is stored alone. As illustrated in FIG. 7, the page number of each of the pages determined as defective pages is stored together with the image data of the corresponding page read by the reading device 307.

Thus, in the example of FIG. 7, the information of the pages determined as defective pages is managed alone.

FIG. 8 is a diagram illustrating a second example of recorded data according to an embodiment of the present disclosure.

Specifically, FIG. 8 illustrates a second example of the table stored in the data storing unit 404. In the example of FIG. 8, the information of all pages is stored. That is, stored are the pages determined as defective pages by the inspecting unit 403 and the pages not determined as defective pages by the inspecting unit 403. As illustrated in FIG. 8, the page number of each page, the image data of the corresponding page read by the reading device 307 (i.e., scanned image data), and the information on the presence or absence of a defect (illustrated as YES or NO, respectively) are stored.

In addition, the master image data of each page may be stored. In this case, the reprint job may be generated according to the master image data stored in the data storing unit 404.

Thus, in the example of FIG. 8, reprinting is executable even in a case in which the inspecting unit 403 determines that there is no defect while an operator determines that there is a defect and inputs a printed matter into the discarding apparatus 104.

As described above, in one embodiment of the present disclosure, reprinting is executed provided that the printed matter determined as a defective printed matter is input into a shredder, thus reliably preventing the printed matter as wastepaper from being taken out without being discarded.

That is, the wastepaper including confidential information such as personal information is prevented from being taken out.

According to the embodiments of the present disclosure, a printed matter is hardly taken out.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image processing apparatus comprising:
    a memory configured to store a result of inspection, the inspection including:
        comparison of a sample image data and a first read image data, the first read image data being data of an image formed on a recording medium and read; and
        determination whether the image indicated by the first read image data is abnormal,
    the memory being configured to store the result of inspection in association with the first read image data of the image determined as an abnormal image; and
    circuitry configured to:
        receive second read image data from a discarding apparatus, the discarding apparatus being configured to destroy the recording medium on which the image is formed in a case where the image indicated by the first read image data is determined as abnormal, and including a document reading device configured to read the image formed on the recording medium, wherein
            the document reading device reads the image formed on the recording medium to generate the second read image data before the recording medium, on which the image determined as abnormal is formed, is destroyed;
        compare the second read image data generated by the document reading device with the first read image data that is scanned from the image formed on the recording medium to determine whether the first read image data is identical to the second read image data;
        generate a reprint job of the image determined as an abnormal image in response to determining that the first read image data is identical to the second read image data; and
        reprint the image determined as an abnormal image in accordance with the reprint job as the recording medium is destroyed.

2. The image processing apparatus according to claim 1, wherein the memory is further configured to store information indicating the abnormal image.

3. The image processing apparatus according to claim 1, wherein the memory is further configured to store image data of a normal image corresponding to the image determined as the abnormal image, and
    wherein the circuitry is configured to generate the reprint job of the image determined as the abnormal image, based on the image data of the normal image stored in the memory.

4. The image processing apparatus according to claim 1, wherein the image processing apparatus is one of an image forming apparatus and a digital front end (DFE).

5. The image processing apparatus according to claim 1, wherein the discarding apparatus includes a document shredder.

6. An image processing method comprising:
    comparing a sample image data and a first read image data, the first read image data being data of an image formed on a recording medium and read;
    determining whether the image indicated by the first read image data is abnormal;
    storing a result of the determining in association with the first read image data of the image determined as an abnormal image;
    receiving second read image data from a discarding apparatus, the discarding apparatus being configured to destroy the recording medium on which the image is formed in a case where the image indicated by the first read image data is determined as abnormal, and including a document reading device configured to read the image formed on the recording medium, wherein
        the document reading device reads the image formed on the recording medium to generate the second read image data before the recording medium, on which the image determined as abnormal is formed, is destroyed;
    comparing the second read image data generated by the document reading device with the first read image data that is scanned from the image formed on the recording medium to determine whether the first read image data is identical to the second read image data;
    generating a reprint job of the image determined as an abnormal image in response to determining that the first read image data is identical to the second read image data; and
    reprinting the image determined as an abnormal image in accordance with the reprint job, as the recording medium is destroyed.

7. The image processing method according to claim 6, wherein the discarding apparatus includes a document shredder.

8. An image processing system comprising:
    a discarding apparatus including:
        a reading device configured to read an image formed on a recording medium; and
        a discarding device configured to destroy the recording medium on which the image is formed in a case where the image is determined as abnormal, and including a document reading device configured to read the image formed on the recording medium; and
    an image processing apparatus including:
        a memory configured to store a result of inspection, the inspection including:
            comparison of a sample image data and a first read image data, the first read image data being data of the image formed on the recording medium and read; and
            determination of whether the image indicated by the first read image data is abnormal, wherein the memory is configured to store the result of inspection in association with the first read image data of the image determined as an abnormal image; and circuitry configured to:
  receive second read image data from the discarding apparatus, the second read image data being data of the image read by the reading device, wherein
    the document reading device reads the image formed on the recording medium to generate the second read image data before the recording medium, on which the image determined as abnormal is formed, is destroyed;
  compare the second read image data that is generated by the document reading device with the first read image data that is scanned from the image formed on the recording. medium to determine whether the first read image data is identical to the second read image data;
  generate a reprint job of the image determined as an abnormal image in response to determining that the first read image data is identical to the second read image data; and
  reprint the image determined as an abnormal image in accordance with the reprint job as the recording medium is destroyed.

9. The image processing system according to claim 8, wherein the discarding device is a document shredder.

* * * * *